United States Patent
Yamamoto

(10) Patent No.: US 10,473,212 B2
(45) Date of Patent: Nov. 12, 2019

(54) AUTOMATIC TRANSMISSION AND CONTROL METHOD FOR ELECTRIC OIL PUMP

(71) Applicants: JATCO Ltd, Fuji-shi, Shizuoka (JP); NISSAN MOTOR CO., LTD., Yokohama-shi, Kanagawa (JP)

(72) Inventor: Hideharu Yamamoto, Fujinomiya (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 19 days.

(21) Appl. No.: 15/558,848

(22) PCT Filed: Jan. 12, 2016

(86) PCT No.: PCT/JP2016/050678
§ 371 (c)(1),
(2) Date: Sep. 15, 2017

(87) PCT Pub. No.: WO2016/152193
PCT Pub. Date: Sep. 29, 2016

(65) Prior Publication Data
US 2018/0073629 A1 Mar. 15, 2018

(30) Foreign Application Priority Data
Mar. 25, 2015 (JP) .................. 2015-063134

(51) Int. Cl.
*F16H 61/00* (2006.01)
*F16H 59/26* (2006.01)
*F16H 59/72* (2006.01)
*F16H 57/04* (2010.01)

(52) U.S. Cl.
CPC ..... *F16H 61/0031* (2013.01); *F16H 57/0434* (2013.01); *F16H 59/26* (2013.01); *F16H 59/72* (2013.01)

(58) Field of Classification Search
None
See application file for complete search history.

(56) References Cited

U.S. PATENT DOCUMENTS 3,800,900 A * 4/1974 Goodale .................. B62D 5/30
180/406
5,517,410 A * 5/1996 Nakagawa .......... F16H 61/0213
701/110

(Continued)

FOREIGN PATENT DOCUMENTS

JP 2001-324009 A 11/2001
JP 2007-198439 A 8/2007

(Continued)

*Primary Examiner* — Colby M Hansen
(74) *Attorney, Agent, or Firm* — Foley & Lardner LLP

(57) ABSTRACT

An automatic transmission includes a mechanical oil pump, an electric oil pump, and a controller. The controller calculates a flow rate of oil necessary for the automatic transmission during the vehicle travels, and drives the electric oil pump when the calculated flow rate of the oil necessary for the automatic transmission is higher than a margin flow rate of the mechanical oil pump generated in a state where a hydraulic pressure necessary for the automatic transmission is ensured.

8 Claims, 7 Drawing Sheets

(56) References Cited

U.S. PATENT DOCUMENTS

| | | | |
|---|---|---|---|
| 5,769,753 A * | 6/1998 | Kusafuka | F16H 61/20 188/DIG. 2 |
| 6,149,547 A * | 11/2000 | Oba | F16H 61/061 477/143 |
| 6,931,316 B2 * | 8/2005 | Joe | F16H 61/6648 180/197 |
| 8,457,850 B2 * | 6/2013 | Inuta | F16H 61/143 192/3.29 |
| 2008/0188351 A1 | 8/2008 | Schiele et al. | |
| 2011/0082630 A1 | 4/2011 | Kawaguchi et al. | |
| 2011/0144846 A1 | 6/2011 | Zollner et al. | |
| 2011/0238274 A1 | 9/2011 | Tsuda et al. | |
| 2014/0278000 A1 | 9/2014 | Yamanaka et al. | |
| 2017/0307065 A1 | 10/2017 | Buchmann et al. | |

FOREIGN PATENT DOCUMENTS

| | | |
|---|---|---|
| JP | 2011-080516 A | 4/2011 |
| JP | 2011-208706 A | 10/2011 |
| JP | 2013-245789 A | 12/2013 |
| JP | 2014-177178 A | 9/2014 |
| JP | 5585736 B2 | 9/2014 |
| WO | WO-2016/116418 A1 | 7/2016 |

\* cited by examiner

AUTOMATIC TRANSMISSION AND CONTROL METHOD FOR ELECTRIC OIL PUMP

TECHNICAL FIELD

The present invention relates to an automatic transmission that includes a mechanical oil pump and an electric oil pump.

BACKGROUND ART

There has been a publicly-known automatic transmission that includes an electric oil pump driven by an electric motor in addition to a mechanical oil pump driven by an engine (JP2007-198439A).

Such automatic transmission can use the electric oil pump to generate hydraulic pressure even in a state where the engine is stopped, thus allowing a shift and lubrication even in an idle stop state where the engine stops.

SUMMARY OF INVENTION

It is considered that the electric oil pump is not necessary to be driven during vehicle traveling because the hydraulic pressure generated by the mechanical oil pump ensures required hydraulic pressure determined by engagement capacity of a clutch, lubrication requirements, etc.

However, even in the case where the required hydraulic pressure is ensured by the hydraulic pressure generated by the mechanical oil pump, when a rotation speed of the engine is low and a flow rate of oil supplied from the mechanical oil pump is low, it takes a time to fill an oil chamber of the clutch to be engaged with the oil to decrease stroke speed of a clutch piston, thus possibly failing to obtain an intended shift speed.

Furthermore, recently, a technique referred to as a predictive control has been proposed such that a gear position achieved by a next shift is predicted, the oil is preliminarily filled (precharged) in the oil chamber of the clutch to be engaged at the predicted gear position, and the clutch is waited in a state of immediately before the engagement, thus increasing the shift speed when the next shift is performed. The automatic transmission that performs such predictive control has a tendency to increase the required flow rate, thus a problem of decreasing the shift speed is remarkable.

The present invention has been made in view of such technical problem, and it is an object of the present invention to review driving conditions of the electric oil pump to prevent the automatic transmission from decreasing the shift speed caused by the insufficient flow rate of the oil.

According to an aspect of the present invention, an automatic transmission mounted on a vehicle, includes a mechanical oil pump driven by an engine, the mechanical oil pump supplying oil to the automatic transmission; an electric oil pump driven by an electric motor, the electric oil pump supplying oil to the automatic transmission; and a controller that calculates a flow rate of the oil necessary for the automatic transmission during the vehicle travels, the controller driving the electric oil pump when the calculated flow rate of the oil necessary for the automatic transmission is higher than a margin flow rate of the mechanical oil pump, the margin flow rate being generated in a state where a hydraulic pressure necessary for the automatic transmission is ensured.

According to the other aspect of the present invention, a control method for an electric oil pump corresponding to the above aspect.

According to these aspects, the electric oil pump is driven when the flow rate of the oil required for the automatic transmission is higher than a margin flow rate of the mechanical oil pump even during vehicle traveling, thus preventing the insufficient flow rate of the oil in the automatic transmission so as to prevent the shift speed decrease caused by the insufficient flow rate of the oil.

DESCRIPTION OF EMBODIMENTS

The following describes an embodiment of the present invention with reference to the accompanying drawings.

Figure 1:
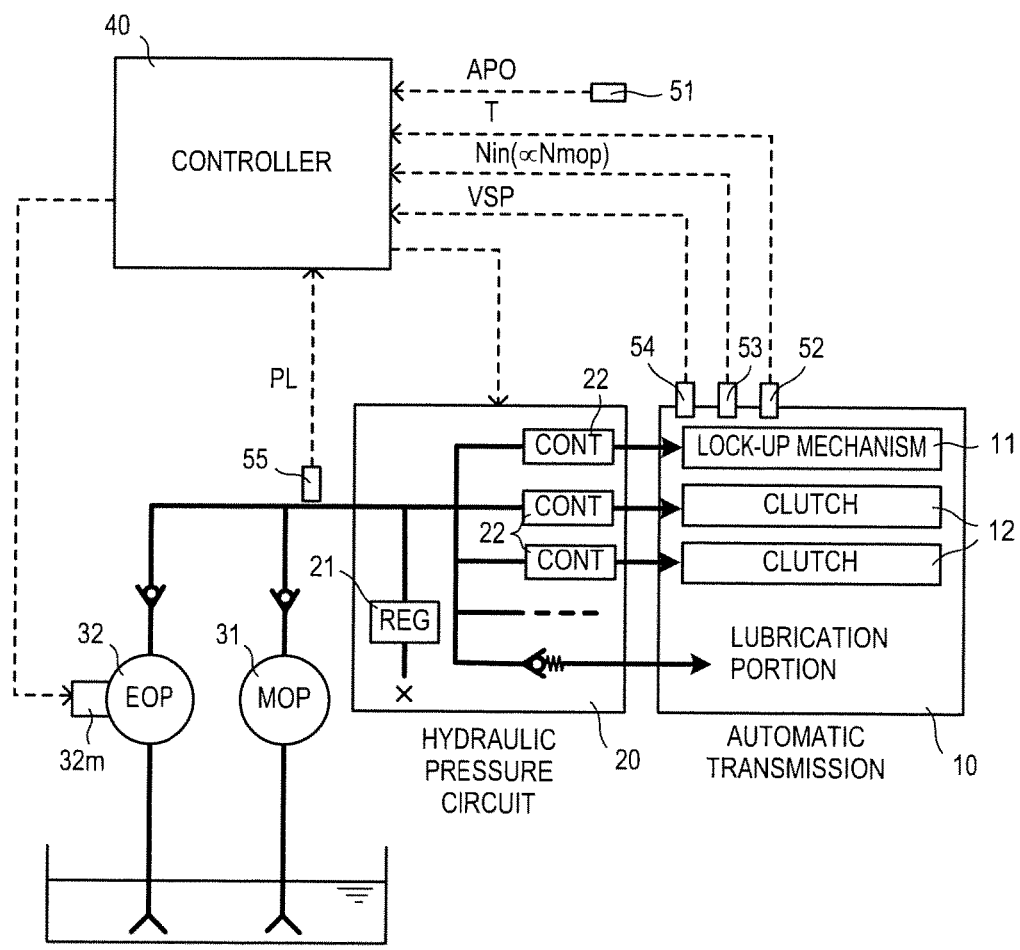
FIG. 1 is a schematic configuration diagram of an automatic transmission and its hydraulic pressure circuit to which the present invention is applied.

FIG. 1 illustrates a schematic configuration of an automatic transmission 10 and a hydraulic pressure circuit 20 thereof to which the present invention is applied.

The automatic transmission 10 is a stepped transmission that includes a plurality of planetary gear mechanisms (not illustrated), a lock-up mechanism 11, and a plurality of clutches 12, and is configured to change a combination of the clutches to be engaged among the plurality of the clutches 12 to ensure a plurality of gear positions. The automatic transmission 10 is mounted on a vehicle, and changes a speed of a rotation input from an engine (not illustrated) as a power source with a speed ratio corresponding to the gear position, thus outputting to driving wheels (not illustrated).

To the lock-up mechanism 11, the plurality of the clutches 12, and lubrication portions of the automatic transmission 10, oil is supplied from the hydraulic pressure circuit 20. The hydraulic pressure circuit 20 includes a regulator valve 21 and a plurality of control valves 22. The regulator valve 21 is a solenoid valve that generates a line pressure PL with a hydraulic pressure generated by any one of or both a mechanical oil pump 31 and an electric oil pump 32 as a source pressure. The plurality of the control valves 22 are solenoid valves that control hydraulic pressures of the oil supplied to respective oil chambers of the lock-up mechanism 11 and the plurality of the clutches 12.

The rotation is transmittable from an input shaft of the automatic transmission 10 to the mechanical oil pump 31 via a gear, and the mechanical oil pump 31 is driven by the engine. The hydraulic pressure generated by the mechanical oil pump 31 varies depending on the rotation of the engine, and when the engine stops, the hydraulic pressure generated by the mechanical oil pump 31 becomes zero.

The electric oil pump 32 is a pump driven by an electric motor 32m. Since the electric motor 32m can be driven by an electric power supplied from a battery (not illustrated), the electric oil pump 32 can be driven regardless of an operating state of the engine.

A controller 40 controls a lock-up state and the gear position of the automatic transmission 10 corresponding to an operating state of the vehicle.

Specifically, the controller 40 receives signals from a sensor 51 that detects an accelerator pedal manipulated variable APO, a sensor 52 that detects an oil temperature T of the automatic transmission 10, a sensor 53 that detects a rotation speed Nin (proportional to a rotation speed Nmop of the mechanical oil pump 31) of the input shaft of the automatic transmission 10, a sensor 54 that detects a vehicle speed VSP, a sensor 55 that detects a line pressure PL, etc.

The controller 40 determines a target lock-up state and gear position on the basis of the signals, and changes a supply state of the oil to the lock-up mechanism 11 and the plurality of the clutches 12 so as to achieve the target lock-up state and gear position.

The controller 40 performs a predictive control together such that a gear position achieved by a next shift is predicted, the oil is preliminarily filled (precharged) in the oil chamber of the clutch to be engaged at the predicted gear position, and the clutch is waited in a state of immediately before the engagement, thus increasing the shift speed when the next shift is performed. The predicted gear positions are, for example, gear positions on an upshift side and a downshift side adjacent to a current gear position.

Here, the hydraulic pressure (hereinafter, a target line pressure tPL) required for the automatic transmission 10 is calculated as follows: a hydraulic pressure Plu required for ensuring a torque capacity necessary for the lock-up mechanism 11, a hydraulic pressure Pc1 required for ensuring a torque capacity necessary for the clutch to be engaged at the selected gear position, a highest value (a required charge pressure) Pchg among the hydraulic pressures required for filling the oil in the respective oil chambers of the clutches to be engaged at the selected gear position and the predicted gear positions, and a hydraulic pressure (a required lubrication pressure) Plub required for supplying the hydraulic pressure to the lubrication portion of the automatic transmission 10 are each calculated and a highest value among the hydraulic pressures is chosen. Then, it is considered that when the rotation speed Nmop of the mechanical oil pump 31 exceeds a rotation speed (hereinafter referred to as "a required rotation speed") Nreq that ensures the target line pressure tPL, the hydraulic pressure is sufficient.

Figure 2:
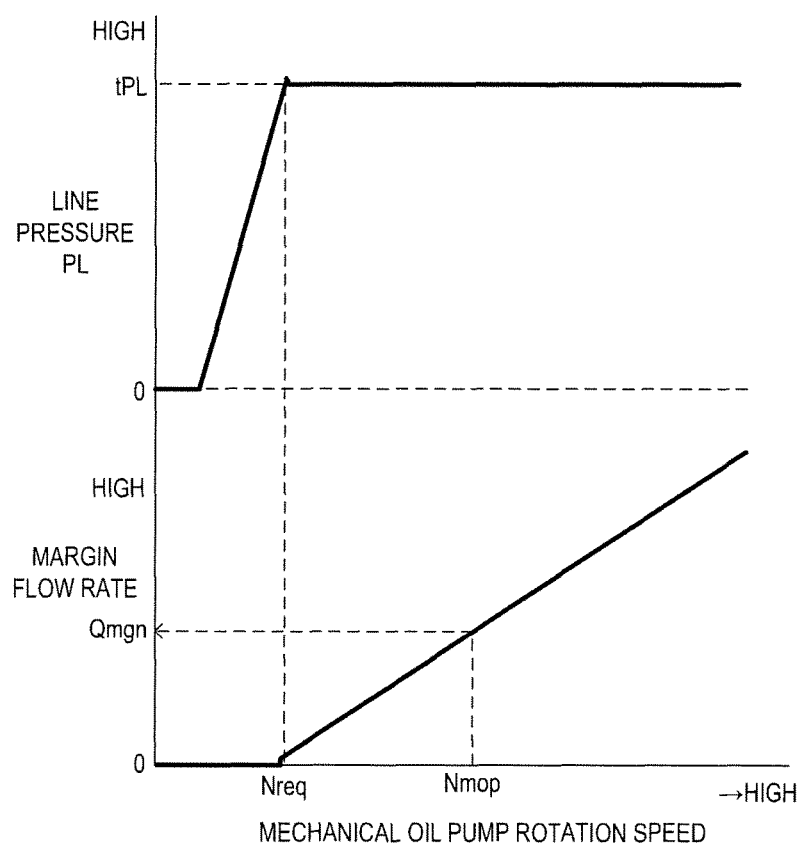
FIG. 2 is a drawing illustrating relations between a line pressure and a margin flow rate, and a rotation speed of the mechanical oil pump.

However, a flow rate (a margin flow rate Qmgn) of the oil available for filling the oil in the oil chamber of the clutch to be engaged to cause the clutch piston to stroke is, as illustrated in FIG. 2, not ensured until the rotation speed Nmop of the mechanical oil pump 31 reach the required rotation speed Nreq to ensure the target line pressure tPL.

Accordingly, even during vehicle traveling, when the difference between the rotation speed Nmop of the mechanical oil pump 31 and the required rotation speed Nreq is small and the margin flow rate Qmgn is also low, it takes a time to fill the oil in the oil chamber of the clutch to be engaged, thus the decreased stroke speed of the clutch piston decreases the shift speed.

Therefore, in this embodiment, the controller 40 executes the following electric oil pump drive control during vehicle traveling so as to actively drive the electric oil pump 32 in a condition of insufficient flow rate of the oil even during vehicle traveling, thus preventing the shift speed from decreasing caused by the insufficient flow rate of the oil.

Figure 3:
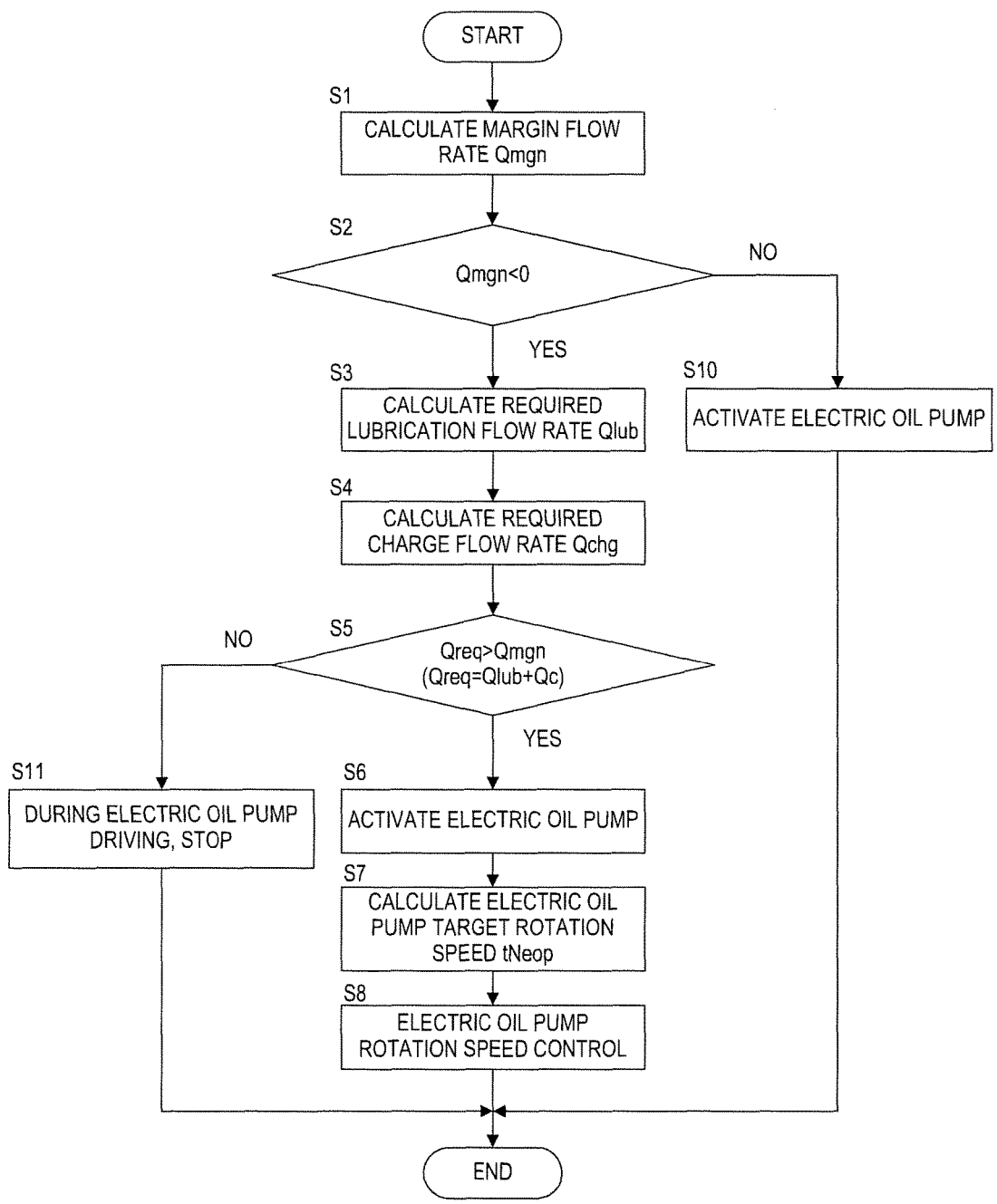
FIG. 3 is a flowchart illustrating a content of an electric oil pump drive control.

FIG. 3 is a flowchart illustrating a content of the electric oil pump drive control. This flowchart is repeatedly executed by the controller 40 during vehicle traveling.

The following describes the content of the electric oil pump drive control in detail by referring to FIG. 3.

First, in Step S1, the controller 40 calculates the margin flow rate Qmgn of the mechanical oil pump 31. Here, the margin flow rate Qmgn is calculated by using an Nmop-PL characteristics table illustrated in FIG. 4. The Nmop-PL characteristics table indicates a relation between the rotation speed Nmop of the mechanical oil pump 31 and the line pressure PL generated by driving the mechanical oil pump 31 by the oil temperatures T.

Figure 4:
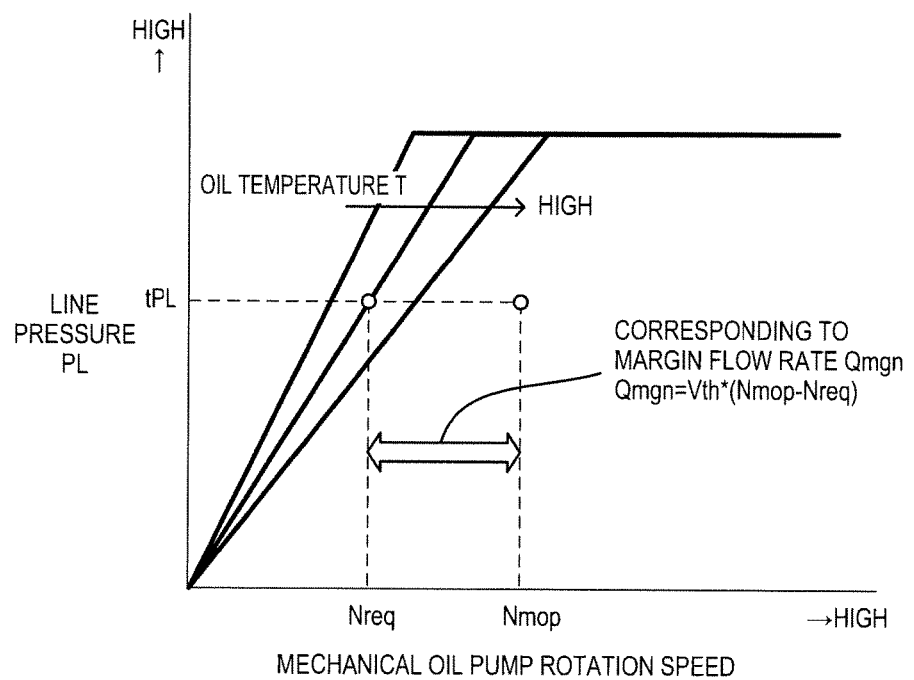
FIG. 4 is an Nmop-PL characteristics table.

The controller 40 selects an Nmop-PL characteristics line corresponding to the oil temperature T detected by the sensor 52 from the Nmop-PL characteristics table illustrated in FIG. 4, and uses the selected Nmop-PL characteristics line to search the required rotation speed Nreq as the rotation speed of the mechanical oil pump 31 required for ensuring the target line pressure tPL. Since the margin flow rate Qmgn is proportionate to a difference between the rotation speed Nmop of the mechanical oil pump 31 (a current rotation speed of the mechanical oil pump 31 calculated from the rotation speed Nin detected by the sensor 53) and the required rotation speed Nreq, the controller 40 multiplies the difference by a constant Vth to calculate the margin flow rate Qmgn.

While the Nmop-PL characteristics table is preliminarily prepared without considering individual difference and aged deterioration in the initial state, this embodiment is configured to correct the Nmop-PL characteristics table from time to time on the basis of actual Nmop-PL characteristics obtained from the sensor detected values for considering the individual difference and the aged deterioration, and the process in Step S1 uses the corrected Nmop-PL characteristics table.

Specifically, the controller 40 obtains the actual Nmop-PL characteristics on the basis of the rotation speed Nmop of the mechanical oil pump 31, which is calculated from the rotation speed Nin of the input shaft of the automatic transmission 10 detected by the sensor 53, and the line pressure PL detected by the sensor 55, and the controller 40 calculates the difference between the Nmop-PL characteristics specified in the Nmop-PL characteristics table and the actual Nmop-PL characteristics, thus correcting the Nmop-PL characteristics table so as to reduce or eliminate the calculated difference.

In Step S2, the controller 40 determines whether the margin flow rate Qmgn is less than zero. When the margin flow rate Qmgn is less than zero, the rotation speed Nmop of the mechanical oil pump 31 is lower than the required rotation speed Nreq, thus the target line pressure tPL as the hydraulic pressure necessary for the automatic transmission 10 is not ensured. In such case, the controller 40 advances the process to Step S10 to immediately activate the electric oil pump 32, thus preventing lock-up failure of the lock-up mechanism 11 and engagement failures of the plurality of the clutches 12.

In contrast, when the margin flow rate Qmgn is higher than zero, the controller 40 advances the process to Step S3.

Figure 5:
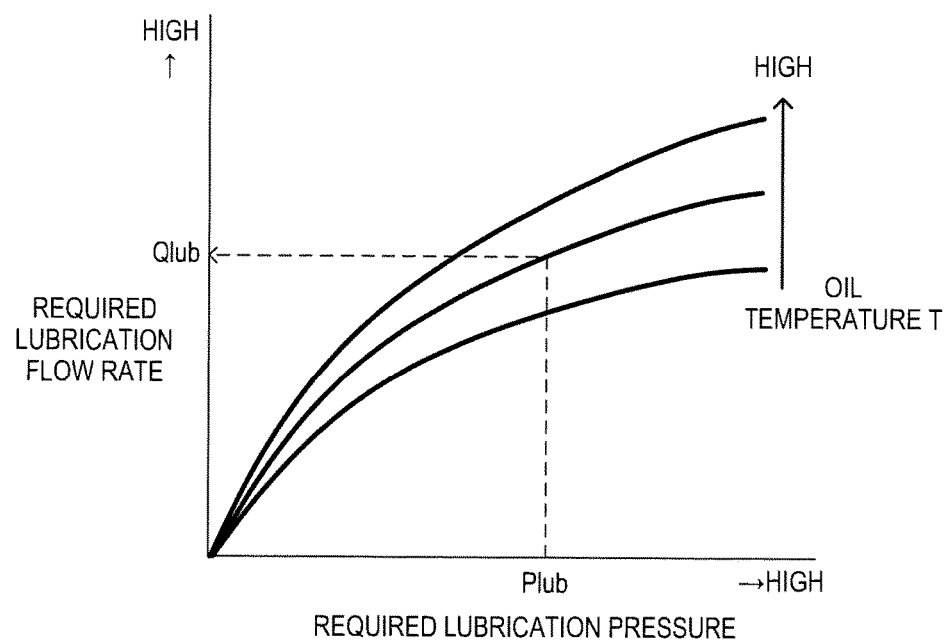
FIG. 5 is a table for calculating a required lubrication flow rate.

In Step S3, the controller 40 calculates the required lubrication flow rate Qlub as the lubrication flow rate necessary for the automatic transmission 10. Specifically, the controller 40 refers to the table illustrated in FIG. 5 to search a value corresponding to the required lubrication pressure Plub, which is used for the calculation of the target line pressure tPL, and the oil temperature T, which is detected by the sensor 52, thus calculating the required lubrication flow rate Qlub. The required lubrication flow rate Qlub has a tendency to increase as the required lubrication pressure Plub increases and as the oil temperature T rises. The required lubrication flow rate Qlub increased as the oil temperature T rises is caused by the oil having viscosity decreased as the oil temperature T rises so as to increase leakage of the oil from the control valve 22, etc.

In Step S4, the controller 40 calculates the required charge flow rate Qchg as a flow rate of the oil required for filling the oil in the oil chamber of the clutch to be engaged among the plurality of the clutches 12.

Figure 6:
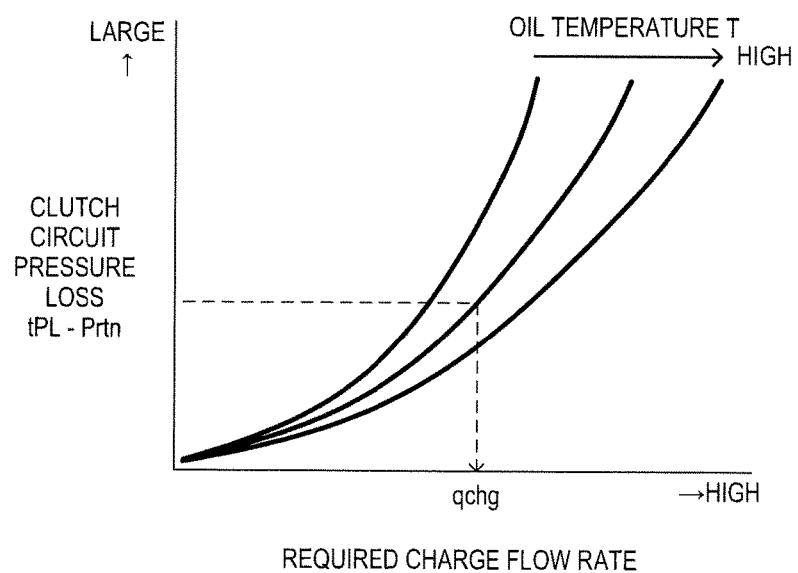
FIG. 6 is a table for calculating a required charge flow rate.

Specifically, the controller 40 searches a value corresponding to a clutch circuit pressure loss, obtained by subtracting a return pressure Prtn (constant) from the target line pressure tPL, and the oil temperature T, detected by the sensor 52, from the table illustrated in FIG. 6 to calculate the required charge flow rates qchg of the respective clutches to be engaged, thus calculating the sum of the required charge flow rates qchg as the required charge flow rate Qchg.

The required charge flow rates Qchg and qchg have tendencies to increase as the required charge pressure Pchg increases and as the oil temperature T rises. The required charge flow rates Qchg and qchg increased as the oil temperature T rises are caused by the oil having viscosity decreased as the oil temperature T rises so as to increase leakage of the oil from the control valve 22 and similar part.

In Step S5, the controller 40 determines whether a required flow rate Qreq as the sum of the required lubrication flow rate Qlub and the required charge flow rate Qchg is higher than the margin flow rate Qmgn. When the required flow rate Qreq is higher than the margin flow rate Qmgn, the flow rate of the oil is insufficient, thus the controller 40 advances the process to Step S6 and the following process so as to drive the electric oil pump 32 to compensate the insufficient flow rate.

Specifically, the controller 40 activates the electric oil pump 32 (Step S6) to calculate a target rotation speed tNeop as the rotation speed of the electric oil pump 32 required for supplying a deficient flow rate Qdef (=the required flow rate Qreq−the margin flow rate Qmgn) from the electric oil pump 32 (Step S7).

Figure 7:
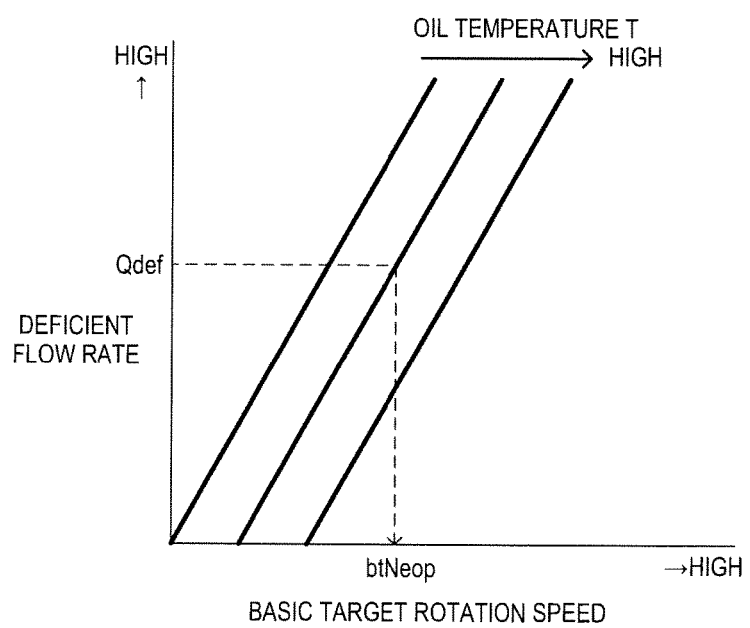
FIG. 7 is a table for calculating a target rotation speed of the electric oil pump.

The target rotation speed tNeop is calculated by searching a basic target rotation speed btNeop from the table illustrated in FIG. 7 to multiply the searched value by a hydraulic pressure correction coefficient.

The table illustrated in FIG. 7 is a table that specifies the relation between the rotation speed of the electric oil pump 32 and the flow rate from the electric oil pump 32. Since the viscosity of the oil decreases as the oil temperature T is high so as to increase the leakage inside the electric oil pump 32, the target rotation speed tNeop has a tendency to increase as the oil temperature T is high even when the deficient flow rate Qdef is identical.

Since the leakage inside the electric oil pump 32 increases as the line pressure PL is high, the hydraulic pressure correction coefficient is configured to have a large value as the target line pressure tPL is high.

After calculating the target rotation speed tNeop, the controller 40 performs the rotation speed control on the electric oil pump 32 such that the rotation speed Neop of the electric oil pump 32 comes to the target rotation speed tNeop. This supplies the oil having the flow rate equal to the deficient flow rate Qdef from the electric oil pump 32, thus avoiding the insufficient flow rate.

On the other hand, when the required flow rate Qreq is determined not to be higher than the margin flow rate Qmgn in Step S5, the flow rate of the oil is sufficient, thus the controller 40 advances the process to Step S11 so as not to drive the electric oil pump 32. When it is during the electric oil pump 32 is driven, the controller 40 stops the electric oil pump 32.

Accordingly, according to the above electric oil pump drive control, the flow rate of the oil (hereinafter referred to as "a required flow rate") Qreq necessary for the automatic transmission 10 is calculated, and when the required flow rate Qreq is higher than the margin flow Qmgn of the mechanical oil pump 31 generated in a state where the hydraulic pressure (the target line pressure tPL) necessary for the automatic transmission 10 is ensured, the electric oil pump 32 is driven.

Specifically, when the required flow rate Qreq is higher than the margin flow rate Qmgn, the electric oil pump 32 is driven such that the oil having the flow rate (hereinafter referred to as "a deficient flow rate") Qdef obtained by subtracting the margin flow rate Qmgn from the required flow rate Qreq is supplied from the electric oil pump 32.

This prevents the insufficient flow rate of the oil in the automatic transmission 10, thus preventing the automatic transmission 10 from decreasing the shift speed caused by the insufficient flow rate of the oil. Unnecessary driving of the electric oil pump 32 is prevented, thus preventing the reduced durability of the electric oil pump 32, the increased battery consumption, and the increased resistance due to the excessive amount of oil caused by the wastefully driven electric oil pump 32.

It should be noted that this advantageous operational advantage is remarkable when the automatic transmission 10 performs the predictive control as this embodiment.

Further, the margin flow rate Qmgn is calculated by referring to the Nmop-PL characteristics table, the difference between the Nmop-PL characteristics specified in the Nmop-PL characteristics table and the actual Nmop-PL characteristics obtained from the detected values by the sensors 53 and 55 is calculated, and the Nmop-PL characteristics table is corrected so as to reduce the difference.

This ensures the margin flow rate Qmgn to be accurately calculated in consideration of the individual difference and the aged deterioration, thus driving the electric oil pump 32 at more appropriate timing.

The embodiment of the present invention described above are merely illustration of one application example of the present invention and not of the nature to limit the technical scope of the present invention to the specific constructions of the above embodiments.

For example, while the above embodiment describes the automatic transmission 10 as a stepped transmission, the automatic transmission may be a continuously variable transmission and a transmission where a continuously variable transmission and a stepped transmission are combined.

The present application claims a priority of Japanese Patent Application No. 2015-063134 filed with the Japan Patent Office on Mar. 25, 2015, all the contents of which are hereby incorporated by reference.

The invention claimed is:

1. An automatic transmission mounted on a vehicle, comprising:
  a mechanical oil pump configured to be driven by an engine, the mechanical oil pump configured to supply oil to the automatic transmission;

an electric oil pump driven by an electric motor, the electric oil pump configured to supply oil to the automatic transmission; and a controller configured to calculate a flow rate of the oil for the automatic transmission during travel of the vehicle, the flow rate being a sum of a lubrication flow rate for the automatic transmission and a charge flow rate sufficient for filling of oil in an oil chamber of a clutch of the automatic transmission to be engaged so as to cause a clutch piston to stroke, and drive the electric oil pump when the calculated flow rate of the oil for the automatic transmission is higher than a margin flow rate of the mechanical oil pump, the margin flow rate being generated after a hydraulic pressure for the automatic transmission has come to a state of being ensured, the margin flow rate being a flow rate of oil available for filling the oil in the oil chamber of the clutch of the automatic transmission to be engaged so as to cause the clutch piston to stroke.

2. The automatic transmission according to claim 1, wherein the controller is configured to drive the electric oil pump such that when the calculated flow rate is higher than the margin flow rate, oil having a flow rate obtained by subtracting the margin flow rate from the calculated flow rate is supplied from the electric oil pump.

3. The automatic transmission according to claim 1, wherein the controller is configured to predict a next shift to perform a precharge in which the oil is preliminarily supplied to a clutch to be engaged at the next shift.

4. The automatic transmission according to claim 1, wherein the controller is configured to:

refer to a characteristics table that specifies a relation between a rotation speed of the mechanical oil pump and a hydraulic pressure generated by the mechanical oil pump to calculate a rotation speed of the mechanical oil pump required for generating the hydraulic pressure for the automatic transmission, calculate the margin flow rate on the basis of a difference between the rotation speed of the mechanical oil pump to generate the hydraulic pressure and the rotation speed of the mechanical oil pump, and correct the characteristics table on the basis of an actual relation between a rotation speed of the mechanical oil pump and a hydraulic pressure generated by the mechanical oil pump, the rotation speed and the hydraulic pressure being obtained from sensor detected values, such that the difference between the relation specified in the characteristics table and the actual relation is reduced.

5. The automatic transmission according to claim 1, wherein the margin flow rate is calculated on the basis of a difference between a required rotation speed and a rotation speed of the mechanical oil pump, the required rotation speed being a rotation speed of the mechanical oil pump to generate the hydraulic pressure.

6. A control method for an electric oil pump in an automatic transmission, the automatic transmission being mounted on a vehicle, the automatic transmission including a mechanical oil pump and an electric oil pump, the mechanical oil pump being driven by an engine, the electric oil pump being driven by an electric motor, the mechanical oil pump and the electric oil pump supplying oil to the automatic transmission, the control method comprising:

calculating a flow rate for the automatic transmission during travel of the vehicle, the flow rate being a sum of a lubrication flow rate for the automatic transmission and a charge flow rate sufficient for filling of oil in an oil chamber of a clutch of the automatic transmission to be engaged so as to cause a clutch piston to stroke; and driving the electric oil pump when the calculated flow rate for the automatic transmission is higher than a margin flow rate of the mechanical oil pump, the margin flow rate being generated after a hydraulic pressure for the automatic transmission has come to a state of being ensured, the margin flow rate being a flow rate of oil available for filling the oil in the oil chamber of the clutch of the automatic transmission to be engaged so as to cause the clutch piston to stroke.

7. The control method for the electric oil pump according to claim 6, wherein the margin flow rate is calculated on the basis of a difference between a required rotation speed and a rotation speed of the mechanical oil pump, the required rotation speed being a rotation speed of the mechanical oil pump to generate the hydraulic pressure.

8. An automatic transmission mounted on a vehicle, comprising:

a mechanical oil pump configured to be driven by an engine, the mechanical oil pump configured to supply oil to the automatic transmission;

an electric oil pump driven by an electric motor, the electric oil pump configured to supply oil to the automatic transmission;

means for calculating a flow rate of the oil for the automatic transmission during travel of the vehicle, the flow rate being a sum of a lubrication flow rate for the automatic transmission and a charge flow rate sufficient for filling of oil in an oil chamber of a clutch of the automatic transmission to be engaged so as to cause a clutch piston to stroke; and means for driving the electric oil pump when the calculated flow rate of the oil for the automatic transmission is higher than a margin flow rate of the mechanical oil pump, the margin flow rate being generated after a hydraulic pressure for the automatic transmission has come to a state of being ensured, the margin flow rate being a flow rate of oil available for filling the oil in the oil chamber of the clutch of the automatic transmission to be engaged so as to cause the clutch piston to stroke.

* * * * *